(12) United States Patent
Kuth et al.

(10) Patent No.: US 6,304,246 B1
(45) Date of Patent: Oct. 16, 2001

(54) INPUT DEVICE FOR SHIFTING A MARKER ON A MONITOR SCREEN

(75) Inventors: Rainer Kuth, Herzogenaurach; Harald Koch, Rosenheim, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/134,932

(22) Filed: Aug. 17, 1998

(30) Foreign Application Priority Data

Aug. 25, 1997 (DE) ............................................... 197 36 928

(51) Int. Cl.[7] ...................................................... G09G 5/08
(52) U.S. Cl. ........................... 345/157; 345/158; 345/211
(58) Field of Search .................................... 345/156–158, 345/163–166; 341/20; 250/237 G, 380; 607/31, 51; 74/471 XY; 200/6 A, 5 A; 600/411, 447, 432, 410; 348/61; 128/903–904; 324/318, 322; 361/683–687; 320/101

(56) References Cited

U.S. PATENT DOCUMENTS

| Re. 36,648 | * | 4/2000 | Uber, III et al. ..................... 600/432 |
| 4,409,479 | * | 10/1983 | Sprague et al. .................. 250/237 G |
| 4,716,287 | * | 12/1987 | Nestler ............................ 250/227.13 |
| 4,918,631 | * | 4/1990 | Hara et al. ............................ 361/683 |
| 5,227,614 | * | 7/1993 | Danielson et al. .................... 235/380 |
| 5,412,419 | * | 5/1995 | Ziarati .................................... 348/61 |
| 5,432,544 | * | 7/1995 | Ziarati .................................... 348/61 |
| 5,724,106 | * | 3/1998 | Autry et al. .......................... 348/734 |
| 5,766,231 | * | 6/1998 | Erickson et al. ....................... 607/51 |
| 5,793,357 | * | 8/1998 | Ivey et al. ............................ 345/166 |
| 5,798,748 | * | 8/1998 | Hilton et al. ......................... 345/156 |
| 5,835,077 | * | 11/1998 | Dao et al. ............................ 345/157 |
| 5,877,732 | * | 3/1999 | Ziarati ..................................... 345/8 |
| 6,016,439 | * | 1/2000 | Acker ................................... 600/411 |
| 6,019,725 | * | 2/2000 | Vesely et al. ........................ 600/447 |

FOREIGN PATENT DOCUMENTS

OS 30 36 217   4/1982 (DE).
OS 43 16 888   11/1994 (DE).
OS 44 41 169   2/1996 (DE).

* cited by examiner

Primary Examiner—Richard Hjerpe
Assistant Examiner—Francis Nguyen
(74) Attorney, Agent, or Firm—Schiff Hardin & Waite

(57) ABSTRACT

An input device for shifting a marker on a monitor has a completely closed, hermetically sealed and sterilizeable housing with an electrical shield, at least one sensor arrangement for detecting movement of the housing, an evaluation unit connected with the sensor arrangement, and a conversion unit connected to the evaluation unit downstream for converting the signals emitted by the evaluation unit into corresponding modulated signals. The sensor arrangement, the evaluation unit and the conversion unit are arranged entirely within the shield as is a transmitting unit for radiating the modulated signals into the environment, where they are detected by a receiver positioned in the environment and are converted into signals for shifting the marker on the monitor.

15 Claims, 3 Drawing Sheets

INPUT DEVICE FOR SHIFTING A MARKER ON A MONITOR SCREEN

BACKGROUND OF THE INVENTION

1. Field of the Invention

The present invention relates to an input device for shifting a marker on a monitor of the type used for program control or for system control via graphic user surfaces.

2. Description of the Prior Art

German OS 43 16 888 discloses an input device of the above general type which is called an "optical mouse". The optical mouse has the shape of a small housing in which an optical scanning system is arranged. The optical scanning system detects the movements in two perpendicular coordinate directions which the mouse executes on a movement base overlaid with a grid of points or lines. Each point or line which is overrun by the optical mouse causes an optical signal to be generated that is converted into a corresponding electrical signal by opto-electronic converters, with the marker on the monitor—generally a cursor—being shifted in position on the basis of the electrical signal. At least one electrical button is generally arranged on the mouse for entering commands that usually serve to initiate functions connected to the position or the path of the cursor on the monitor. The mouse is connected to a separately arranged evaluation unit via optically conductive fibers exclusively. The optically conductive fibers transmit the optical signals from the optical scanning system to the evaluation unit. Since the detection of the relative motion of the two parts with respect to one another occurs purely optically and is emitted as an optical signal via optically conductive fibers, disturbing electric or magnetic influences from the operating system are precluded. Disturbing electrical or magnetic signals that may disturb the operation of the connected computer likewise cannot be picked up. A drawback, however, is that due to the optically conductive fibers the mouse cannot be operated in the sterile working environment of a surgeon.

German OS 44 41 169 also discloses an input device having a housing in which motion detectors are arranged along with an evaluation and protocol circuit connected thereto. The housing contains an electrical shield within which motion detectors and the evaluation and protocol circuit are arranged, along with an electro-optical conversion unit connected to the latter. The electro-optical conversion unit converts the electrical signals emitted by the evaluation and protocol circuit into corresponding optical signals. A lead-through filter is arranged in the shield through which the evaluation and protocol circuit can be powered with electrical energy. An opening is further arranged in the shield through which the fiber-optical transmission means (light waveguides) connected to the electro-optical conversion unit are led out of the shield. By means of the transmission of the control signals via a light waveguide it is guaranteed that an undisturbed data transmission to a connected computer is possible even in high-frequency electromagnetic fields. A disturbance by the input device itself is also thereby precluded. Operation in the sterile working environment of a surgeon, however, is not possible in this case, either.

German OS 30 36 217 describes a stationary input device which operates a medical device disposed at a distance from the input device can be operated. The input device contains a transmitter for the wireless transmission of control commands to the medical device being controlled, a switch arrangement for controlling the transmitter dependent on the operating elements of the input device, and an energy storage unit (battery). The input device can be surrounded by a sterilizeable jacket or shell that is permeable at the frequency of the transmitter.

SUMMARY OF THE INVENTION

It is an object of the present invention to provide an input device of the initially described general type that can be operated not only in a sterile working environment of a surgical operating room but also in the immediate vicinity of, as well as within, an MR tomography apparatus.

The inventive input device for shifting a marker on a monitor has a completely closed, hermetically sealed and sterilizeable housing with an electric shield, at least one sensor arrangement which detects a movement of the housing, and an evaluation unit connected with the sensor arrangement, as well as a conversion unit connected to the evaluation unit downstream. The sensor arrangement can be composed of optical sensors, sensors based on microswitches or pressure-sensitive sensors. The conversion unit serves to convert the signals emitted by the evaluation unit into corresponding modulated signals. The sensor arrangement, the evaluation unit and the conversion unit are arranged entirely inside the electrical shield. The inventive input unit further contains a transmitting unit for radiating the modulated signals to the environment (broadcasting), where they are detected by a receiver positioned in the environment and are converted into signals for shifting the mark on the monitor.

In an embodiment of the input device the signals emitted by the evaluation unit are converted into corresponding signals, broadcast, and detected by a receiver positioned in the environment. These signals can be optical signals or radio signals, for example. The frequency of the radio signal (transmission frequency) thereby lies above the NMR frequency of a magnetic resonance tomography apparatus, preferably over 100 MHZ. Thus harmonic oscillations of the radio signal cannot cause interferences with the NMR frequency of the magnetic resonance tomography apparatus. The NMR frequency, which is proportional to the strength of the basic magnetic field, is about 63 MHZ given a basic magnetic field strength of 1.5 T, and about 84 MHZ given a basic magnetic field strength of 2 T. The transmission frequency must be permitted by (available from) the responsible licensing authorities. In Germany the transmission frequency of 433.92 MHZ is available, for example.

The inventive input device thus enables an optical detection of the motion of the housing and a transmission of the signals by radio (e.g. radio frequency). For the transmission by radio components known from mobile radio technology can be utilized, for example. A mechanical and/or pressure-dependent detection of the motion of the housing and a transmission of the signal on an optical path (e.g. infrared) are also possible.

Fiber-optical transmission means are thus unnecessary in the inventive input device. Thus not only is the operating comfort increased, but also the capability of operating the inventive input device in the sterile working environment of a surgeon is produced. The modulation of the signals by the evaluation unit and the radiation thereof as modulated signals are necessary so that the different directions of motion of the input device can be distinguished from one another and from the actuation of a button element, if used. For reasons of performance an amplitude modulation should precede a frequency modulation. The range of the emitted signals should generally equal at least five meters so that an unrestricted function within the operating room is guaranteed. For applications in the treatment room of a doctor shorter ranges of the emitted signals may be sufficient.

The input device can have a two-piece housing composed of acrylonitrile-butadiene-styrol-polymerisate (ABS) or polycarbonate (PC), which are welded together. Such an input device is suitable without problems for all types of sterilization (cold gas sterilization, hot vapor sterilization, plasma sterilization).

DESCRIPTION OF THE PREFERRED EMBODIMENTS

Figure 1:
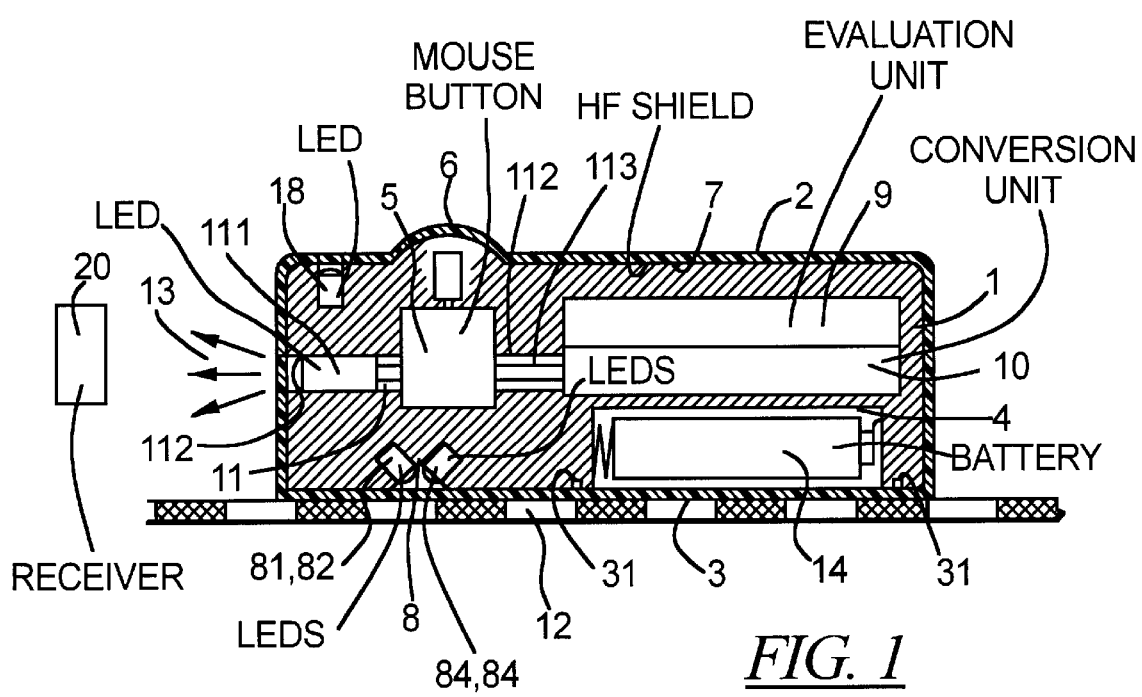
FIG. 1 shows a longitudinal section through a first embodiment of the inventive input device.

In FIGS. 1 to 4 an entirely closed, hermetically sealed and sterilizeable housing of an input device is generally designated 1. Such an input device is known by the term "mouse", for example.

The housing 1 is almost completely covered by a thin, transparent plastic film 2 in order to prevent the penetration of dirt particles, secretions or blood in an operating room environment. Only an opening for a battery compartment at the underside of the housing 1 is left exposed. This can be closed by a lid 3.

The housing 1 is produced from a non-conductive and (for avoiding artifacts in the MR recording) non-ferromagnetic material which should in addition be biocompatible. These requirements also exist for the plastic film 2.

Since the input device is intended to be used by surgeons during an operation, among other uses, drops of blood may reach the housing 1 of the input device from the glove of the operator and transferred from there back into the patient again. Furthermore, at least an indirect contact with tissue cannot be ruled out. The input device must thus be permitted for use according to category 3 of the ISO norm 10993, part 1, paragraph 5. Medical products which may possibly physically communicate with the interior of the body from the outside fall under this category 3.

Furthermore, the material from which the housing 1 is produced should be resistant to solvents.

Beyond this, the material for the housing 1 of the input device must be temperature- stable up to at least 80° C. (up to six hours cold gas sterilization with ethylene gas), or up to over 120° C. (sterilization by hot vapor).

Because of these extreme conditions acrylonitrile-butadiene-styrol-polymerisate (ABS) or polycarbonate (PC) are most suitable as materials for the housing.

At the top side of the housing 1 there are three mouse buttons 5, only one of which is visible in the sectional views. The mouse buttons are constructed as pushbuttons. The plastic film is configured in a three-dimensionally curved shape at the point at which the operating elements of the mouse buttons 5 are disposed, thus forming what is known as a dome 6. This has the advantage that the button location can be determined without looking. Another advantage is that there is a definite sense of actuation, since the dome 6 noticeably yields following a short initial resistance. There is thus a kind of acknowledgment through the defined pressure point as to whether the mouse button 5 has been fully depressed.

To achieve MR-compatibility the mouse is completely clad on the inside of its housing 1 with a shield 7 of, for example, copper film. HF radiation generated by the mouse is thereby prevented from reaching the outside and causing artefacts in the MR recordings. Such a shield 7 is relatively simple to provide, since the mouse depicted does not have a ball on its underside for detecting relative motion like a conventional mouse, but rather has a completely closed housing 1.

Figure 2:
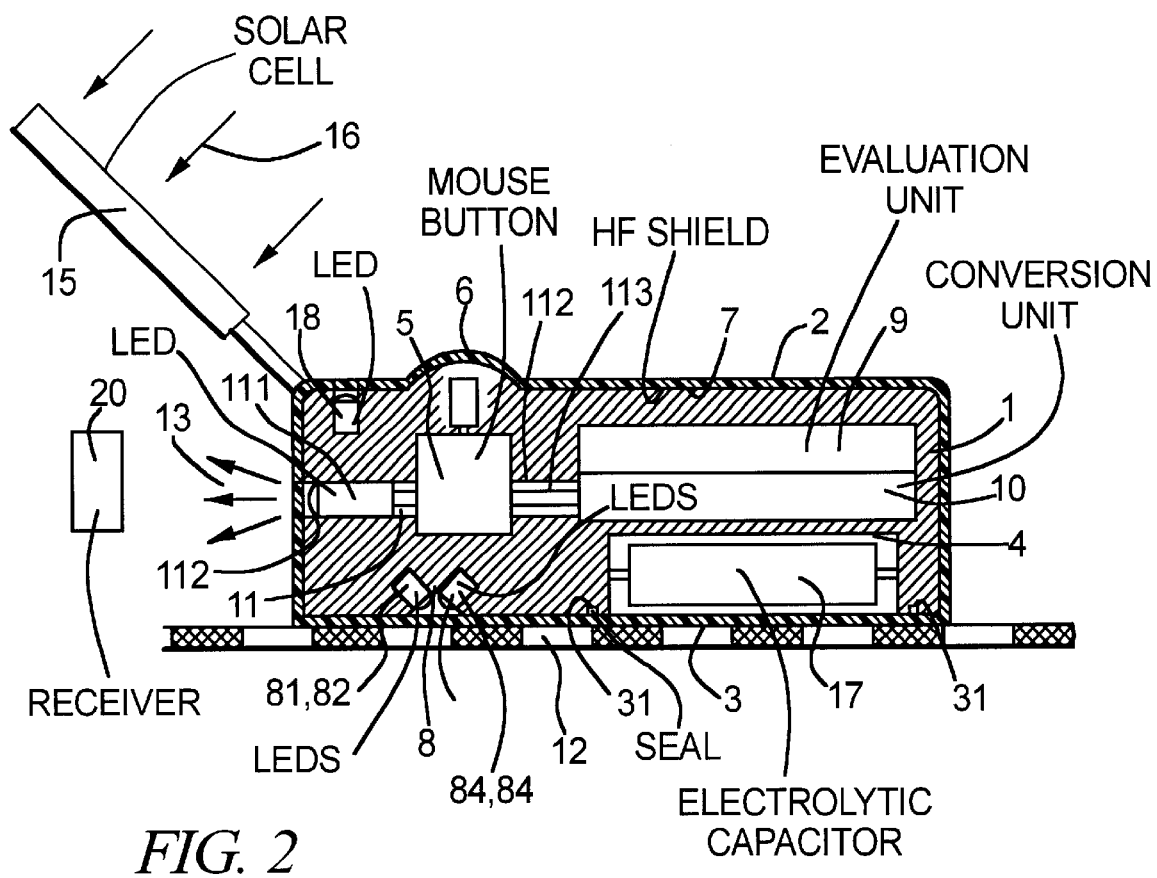
FIG. 2 shows a longitudinal section through a second embodiment of the inventive input device.

Movement of the housing 1 is detected by a sensor arrangement 8, which is constructed as an optical sensor arrangement in the embodiments depicted in FIGS. 1 and 2. The sensor arrangement 8 is arranged inside the shield 7 of the housing 1. An evaluation unit 9 that is connected to the sensor arrangement 8 and a conversion unit 10 that is connected to the evaluation unit 9 downstream are also arranged inside the shield 7.

The conversion unit 10 converts the modulated signals emitted by the evaluation unit 9 into corresponding modulated optical signals. The modulated signals, on the basis of which the markers are shifted on the monitor, are radiated (broadcast) via an optical transmitting unit 11 and are detected and demodulated by a receiver 20 remotely positioned in the environment. (The distance from the mouse to the receiver 20 shown in the drawings being significantly compressed for illustrative purposes.)

In the exemplary embodiment according to FIG. 1 the sensor arrangement 8 for detecting the motion of the housing 1 contains a first optical transmitter 81 and a second optical transmitter 82 which are arranged at the underside of the housing 1. With varying frequencies, the two optical transmitters 81 and 82 radiate light onto a movement base 12 on which the housing 1 is movable.

The sensor arrangement 8 for detecting the motion of the housing 1 further contains a first optical detector 83 and a second optical detector 84, the first optical detector being associated with the first optical transmitter 81, and the second optical detector 84 being associated with the second optical transmitter 82.

The base 12 has a grid of points or lines in the x-direction and in the y-direction, the grid spacing in the x-direction being tuned to the frequency range of the first optical transmitter 81, and the grid spacing in the y-direction is tuned to the frequency range of the second optical transmitter 82. The radiation emitted by the first optical transmitter 81 is thus absorbed by the open spacing in the x-direction, and the radiation emitted by the second optical transmitter 82 is absorbed by the open spacing in the y-direction.

The conversion unit 10 that converts the modulated signals emitted by the evaluation unit 9 into corresponding modulated optical signals is constructed as an electro-optical conversion unit.

If the mouse is now moved over the base 12, light/dark variances are detected by the two optical detectors 83 and 84 and are converted into electrical signals. These modulated electrical signals are evaluated by the evaluation unit 9 and are emitted to the electro-optical conversion unit 10. The electro-optical conversion unit actuates an optical transmission unit 11 formed by infrared LEDs 111 (power infrared LEDs) arranged at the face of the housing 1. The infrared light 13 emitted by the infrared LEDs 111 is transmitted via multiple reflection off the walls of a light guide 112 to a receiver 20 placed arbitrarily in space, independent of the direction in which the transmitting LEDs 111 of the optical transmitting arrangement 11 radiate light. A subsequent control electronics unit converts the modulated infrared signal 13 detected by the receiver 20 into compatible mouse port signals which are then forwarded to the serial interface of a computer. The modulation of the signals by the evaluation unit 9 and the radiating of this modulated signal as modulated optical signal are necessary so that the different directions of motion of the mouse can be distinguished from one another and from the actuation of the mouse button 5.

In the exemplary embodiments depicted in FIGS. 1 and 2 the infrared light-emitting diodes 111 are respectively arranged in a hollow light guide 112. The hollow light guide 112 is disposed in the housing 1 and extends to the conversion unit 10. The hollow light guide 112 is not entirely visible in FIGS. 1 and 2 since it passes behind the mouse button 5.

By arranging the infrared light-emitting diode 111 in the hollow light guide 112 shielding is further improved in the region of the transmitting unit 11, since disturbing HF radiation cannot exit the housing 1 at the infrared light-emitting diode 111, and the electrical connection 113 between the infrared light-emitting diode 111 and the conversion unit 10 is protected from disturbing HF radiation arising in the housing 1.

In the version depicted in FIG. 1 the power supply of the mouse occurs through non-magnetic batteries 14 accommodated in the battery compartment 4 on the underside of the housing 1. The battery compartment 4 is sealed by a rubber seal 31 so that the penetration of dirt or liquids is prevented. The battery compartment lid 3 is secured against unintentional opening with a screw, for example.

Another possibility is to equip the battery compartment lid 3 with snap locks in order to enable a simple disassembly of the input device for sterilization.

Alternatively, it is possible to secure a solar module 15 at the face of the housing (see FIG. 2). The current generated by ambient light 16 charges an antimagnetic electrolyte capacitor 17 located in the interior of the housing 1 that assumes the function of an accumulator.

In the embodiments depicted in FIGS. 1 and 2 the transmission status of the mouse is displayed by a control lamp 18 (e.g. LED). A "sleep mode" is additionally provided which minimizes the current consumption of the mouse in the standby (unused) state. To check if the mouse is in the resting standby, it can be determined whether light/dark variances are being reported to the evaluation unit 9. If there are no light/dark variances, then the mouse is stationary on the base 12.

Figure 3:
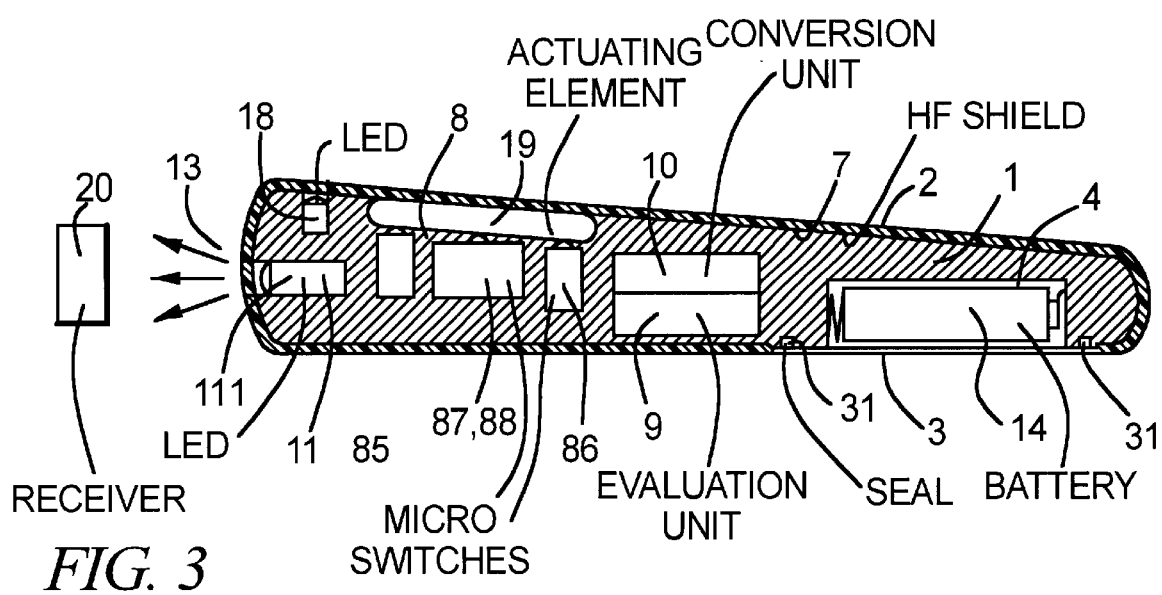
FIG. 3 shows a longitudinal section through a third embodiment of the inventive input device.
Figure 4:
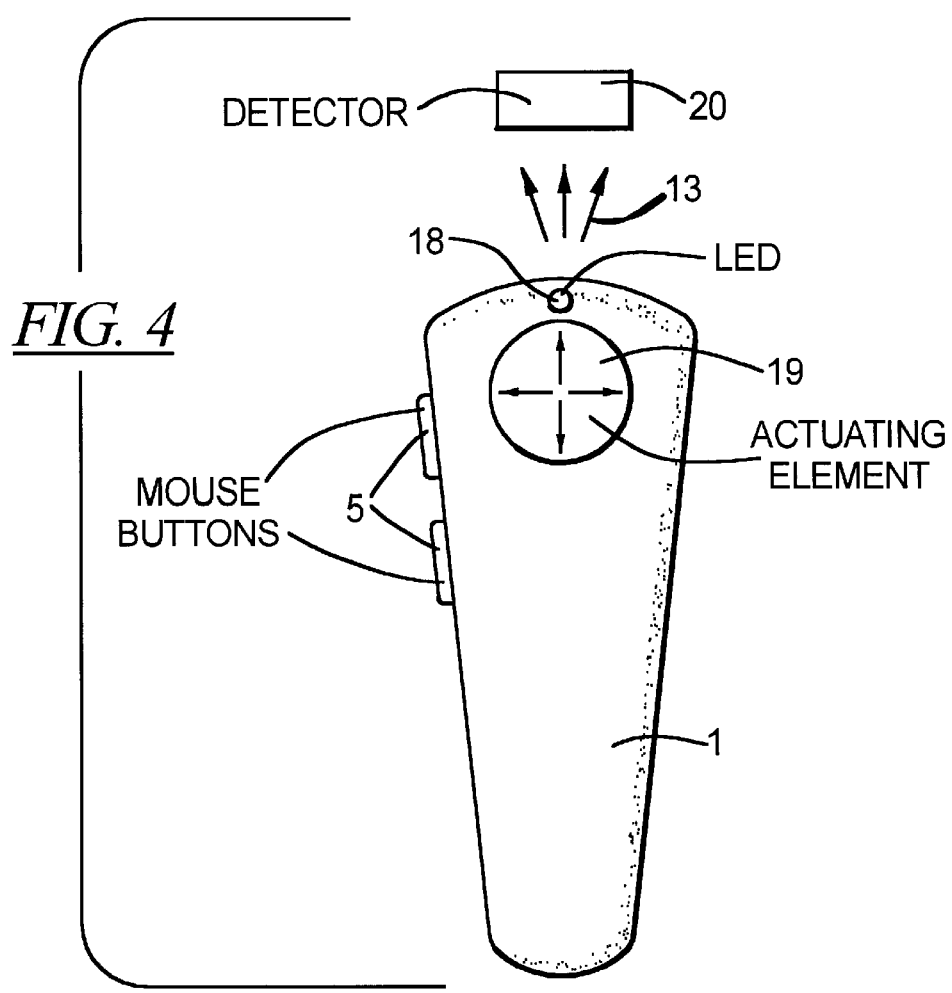
FIG. 4 is a plan view of the inventive input device according to FIG. 3.

In the embodiment of the inventive input device depicted in FIGS. 3 and 4 a base 12 is unnecessary. For sterility, the housing 1 is again covered with a thin transparent plastic film 2 except for an exposed area for the battery compartment 4.

The sensor arrangement 8 that detects movement of the housing 1 is again arranged inside the shield 7 of the housing 1. Furthermore, an evaluation unit 9 connected to the sensor arrangement 8 and a conversion unit 10 connected to the evaluation unit 9 downstream are arranged inside the shield 7.

The sensor arrangement 8 for detecting the motion of the housing 1 contains four microswitches 85 to 88 arranged at right angles to each other in the housing 1. The microswitches 85 to 88 are located beneath a movable actuating element 19 arranged on the top side of the housing 1 and are functionally coupled therewith. One direction of motion of the housing 1 and thus one direction for moving the marker on the monitor, is allocated to each microswitch 85 to 88, i.e. upwardly, downwardly, to the left and to the right.

The conversion unit 10 that converts the modulated signals emitted by the evaluation unit 9 into corresponding modulated optical signals is constructed as an electro-optical conversion unit.

Instead of the microswitches 85 to 88 a corresponding number of pressure-sensitive resistors can be inserted under the actuation element 19.

The electro-optical conversion unit 10 actuates an optical transmitting unit 11 formed by infrared light-emitting diodes 111 (power infrared LEDs) arranged at the face of the housing 1. The light 13 emitted by the infrared light-emitting diodes 111 is transmitted via multiple reflections at the walls of a light guide to a receiver 20 placed arbitrarily in space, independent of the direction in which the transmitting LEDs 111 of the optical transmitting unit 11 radiate light. A subsequent control electronics unit converts the modulated infrared signals 13 detected by the receiver 20 into compatible mouse port signals which are then forwarded to the serial interface of a computer. The modulation of the signals by the evaluation unit 9 and the radiating of these modulated signals as modulated optical signals are necessary so that the directions of motion of the mouse can be distinguished from each other and from the actuation of the mouse button 5.

In this embodiment the mouse buttons are located laterally at the housing 1. There, the mouse buttons 5 can be comfortably actuated with the index finger or middle finger. The actuating elements of the mouse buttons 5 are again located under a dome 6.

A "sleep mode" is likewise provided in this embodiment. The standby state of the mouse is checked by monitoring whether the microswitches 85 to 88 are transmitting signals to the evaluation unit 9. The transmitting state is signaled via a control lamp.

Figure 5:
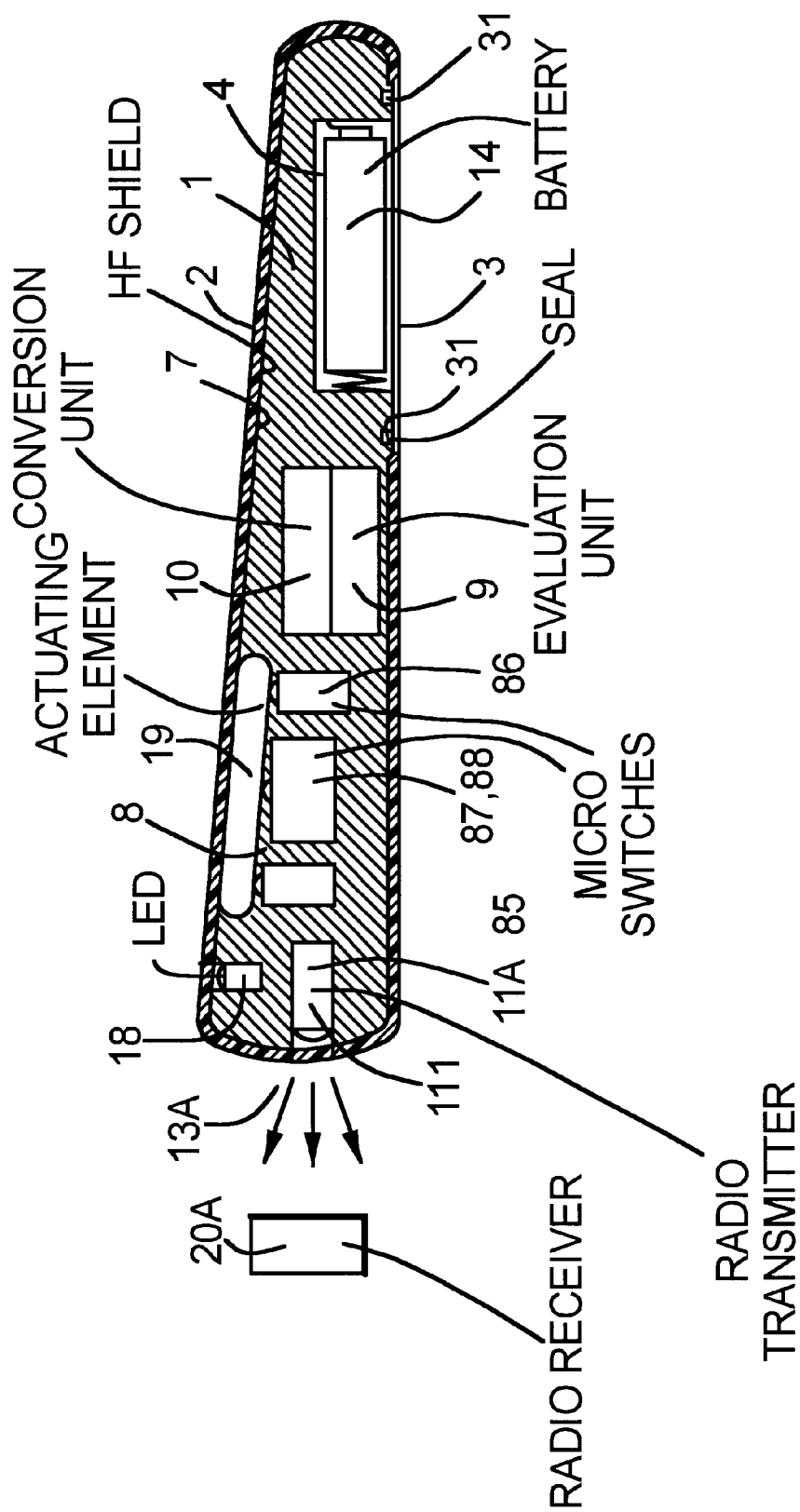
FIG. 5 shows a longitudinal section through a fourth embodiment of the inventive input device.

As shown in FIG. 5 embodiments with respect to the modulated optical signals apply analogously if radio signals are utilized instead of the infrared signals for the transmission of the motion of the housing 1 in which case a radio transmitter 11A which emits RF signals 13A, and a radio receiver 20A are employed.

Although modifications and changes may be suggested by those skilled in the art, it is the intention of the inventors to embody within the patent warranted hereon all changes and modifications as reasonably and properly come within the scope of their contribution to the art.

We claim as our invention:
1. An input device for shifting a marker on a monitor screen, comprising:
   a completely closed, hermetically sealed and sterilizeable housing containing an electrical shield;
   at least one sensor means for detecting movement of said housing and for generating a sensor means output signal dependent on the movement;
   an evaluation unit supplied with said sensor means output signal which evaluates said sensor means output signal and generates a control signal for use in shifting a position of a marker on a monitor screen;
   a conversion unit supplied with said control signal for converting said control signal into a modulated signal, said sensor means, said evaluation unit and said conversion unit being disposed completely within said shield; and transmitting means for broadcasting said modulated signal by radiating said modulated signal into the environment to a location remote from said transmitting means; and a non-magnetic energy source in said housing, connected to said evaluation unit, said conversion unit and said transmitting means, for supplying power to each of said evaluation unit, said conversion unit and said transmitting means, said non-magnetic energy source being selected from the group consisting of a non-magnetic battery, a non-magnetic accumulator and a non-magnetic electrolytic capacitor.

2. An input device as claimed in claim 1 further comprising detector means, disposed at said location remote from said transmitting means, for receiving the modulated signal broadcast by said transmitting means, said detector means including means for demodulating said control signal and said detector means being adapted for supplying said control signal to a monitor for shifting a position of a marker on a screen of the monitor.

3. An input device as claimed in claim 1 wherein said sensor means comprises:

a first optical transmitter and a second optical transmitter disposed at an underside of said housing, said first optical transmitter radiating light at a first frequency onto a movement base on which said housing is movable, and said second optical transmitter radiating light at a second frequency, different from said first frequency, onto said movement base;

a first optical detector disposed for receiving said light from said first optical transmitter after reflection from said movement base, and a second optical detector disposed for receiving said light from said second optical transmitter after reflection off said movement base, said first optical detector generating first detector signals dependent on the light radiated from said first optical transmitted and, reflected from said movement base, and said second optical detector generating second detector signals dependent on the light radiated by said second optical transmitter and reflected from said movement base and said first and second detectors respectively supplying said first and second detector signals, as said sensor means output signal, to said evaluation unit; and said movement base comprising a grid of elements disposed in an x-direction and a y-direction, with a spacing between elements in the x-direction being tuned to the frequency of said first optical transmitter and the spacing between said elements in the y-direction being tuned to said second frequency.

4. An input device as claimed in claim 3 wherein said grid of elements on said movement base exhibits light and dark variations, said variations altering said light reflected from said movement base from said first and second optical transmitters, and said light and dark variations thereby being detectable by said first detector and said second detector, respectively.

5. An input device as claimed in claim 1 wherein said sensor means comprises four microswitches disposed at right angles relative to each other at a top side of said housing and an actuating element disposed at said top side of said housing and in mechanical contact with each of said four microswitches.

6. An input device as claimed in claim 1 wherein said sensor means comprises four pressure-dependent resistors disposed at right angles relative to each other at a top side of said housing and an actuating element disposed at said top side of said housing and in mechanical contact with each of said four pressure-dependent resistors.

7. An input device as claimed in claim 1 further comprising at least one manually operable button for entering commands disposed at said housing and being connected to said transmitting means, said button causing said transmitting means to broadcast optical signals having respectively different optical characteristics dependent on an actuation position of said button.

8. An input device as claimed in claim 1 wherein said transmitting means comprises means for transmitting optical signals.

9. An input device as claimed in claim 7 wherein said transmitting means comprises an infrared light-emitting diode contained in a hollow light waveguide, said hollow light waveguide being contained in said housing and extending to said conversion unit.

10. An input device as claimed in claim 1 wherein said transmitting means comprises means for transmitting radio signals.

11. An input device as claimed in claim 10 wherein said transmitting means comprises means for transmitting radio signals at a frequency above a nuclear magnetic resonance frequency of a magnetic resonance tomography apparatus.

12. An input device as claimed in claim 11 wherein said means for transmitting radio signals comprises means for transmitting radio signals at a frequency over 100 MHZ.

13. An input device as claimed in claim 1 further comprising at least one solar cell mounted at an exterior of said housing, and wherein said non-magnetic energy source is means connected to said solar cell for storing energy produced by said solar cell.

14. An input device as claimed in claim 1 wherein said housing comprises two housing parts welded together, each of said housing parts being comprised of acrylonitrile-butadiene-styrol-polymerisate.

15. An input device as claimed in claim 1 wherein said housing comprises two housing parts welded together, each of said housing parts being comprised of polycarbonate.

* * * * *